(No Model.)  
2 Sheets—Sheet 1.

C. C. BRADLEY.
TWO SEATED VEHICLE.

No. 503,308. Patented Aug. 15, 1893.

Witnesses:
Chas. F. Burkhardt.
Theo. L. Popp.

C. C. Bradley Inventor.
By Wilhelm & Bonner
Attorneys.

(No Model.) 2 Sheets—Sheet 2.
C. C. BRADLEY.
TWO SEATED VEHICLE.
No. 503,308. Patented Aug. 15, 1893.
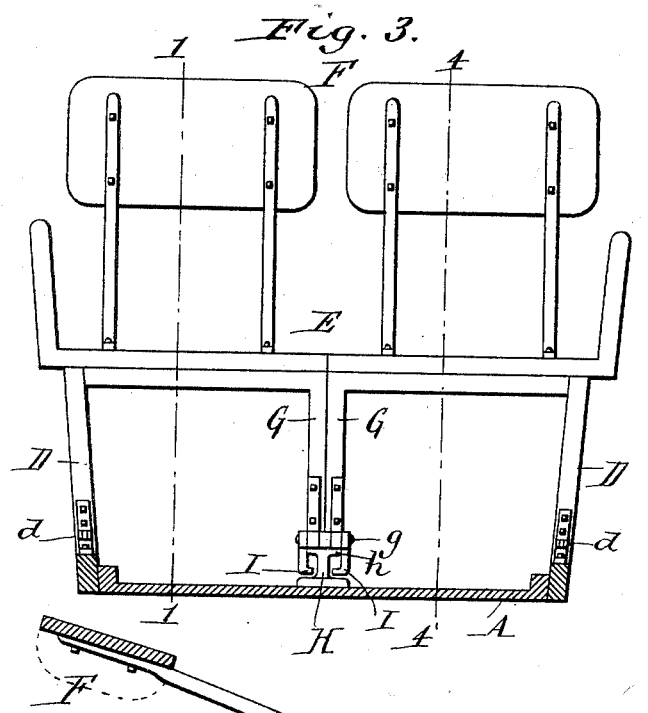
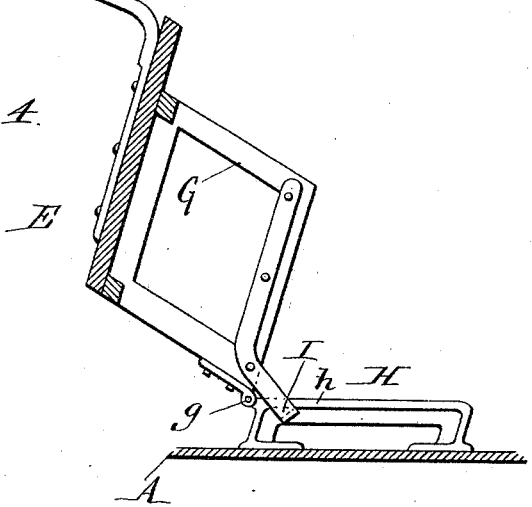
Witnesses:
Chas. F. Burkhardt
Theo. L. Popp
C. C. Bradley, Inventor.
By Wilhelm Bonner
Attorneys.

UNITED STATES PATENT OFFICE.

CHRISTOPHER C. BRADLEY, OF SYRACUSE, NEW YORK.

TWO-SEATED VEHICLE.

SPECIFICATION forming part of Letters Patent No. 503,308, dated August 15, 1893.

Application filed May 2, 1893. Serial No. 472,705. (No model.)

*To all whom it may concern:*

Be it known that I, CHRISTOPHER C. BRADLEY, a citizen of the United States, residing at Syracuse, in the county of Onondaga and State of New York, have invented new and useful Improvements in Two-Seated Vehicles, of which the following is a specification.

This invention relates to that class of two-seated vehicles in which the seats are movable so that the vehicle can be used either with both seats as a two-seated vehicle, or with the front seat only as a vehicle with a single seat, and has the object to provide simple means for converting the vehicle from a two-seated to a single-seated vehicle and vice-versa and for holding the seats securely in their respective positions, while presenting a neat and attractive appearance.

Figure 1:
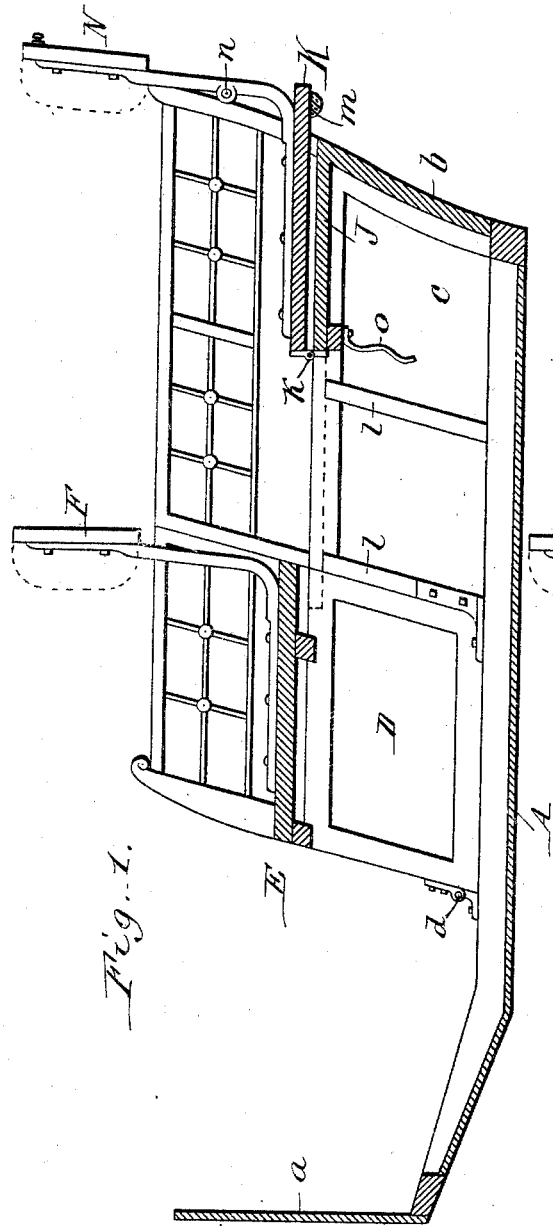
Figure 2:
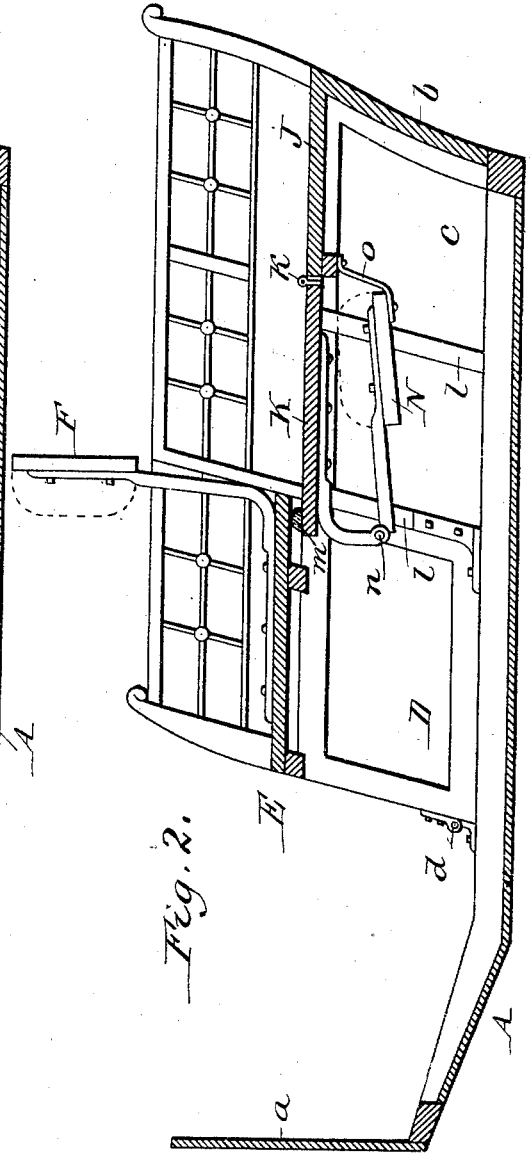

In the accompanying drawings consisting of two sheets:—Figure 1 is a vertical sectional elevation of my improved vehicle showing both seats in their operative positions, the section being taken in line 1—1, Fig. 3. Fig. 2 is a similar view showing the rear seat folded down. Fig. 3 is a cross section of the vehicle in front of the front seat. Fig. 4 is a longitudinal section through the front seat in line 4—4, Fig. 3, but showing the seat tipped forwardly.

Like letters of reference refer to like parts in the several figures.

A represents the bottom of the body, a the dash board, b the tail board and c the side panels of the body, rigidly secured together. The side panels of the body extend forwardly from the tail board to the rear edges of the side panels D of the front seat E. The side panels of the front seat form a forward continuation of the side panels of the body, when the front seat is in its normal position, and are attached at or near their lower front corners to the bottom, or its side sills, by hinges d, so that the front seat, to which the seat panels D are permanently secured can be tilted forwardly to give access to the rear seat.

F is the back of the front seat which is rigidly secured thereto.

The front seat is preferably divided longitudinally in the center, as shown in Fig. 3, and each part is supported at its inner end by a vertical longitudinal frame G which is attached at its lower front corner to a supporting bracket or loop H by a hinge g which is arranged in line with the hinges d of the seat panels. This bracket or loop is secured to the bottom, lengthwise of the same, and supports both frames G when the front seat is in its normal position. The top h of the bracket projects laterally on each side beyond its central web.

I represents a hook depending from each frame G and engaging with its inwardly projecting lip against the under side of the top h, when the seat has been tilted forwardly, as shown in Fig. 4, thereby arresting the forward movement of the seat on its hinges when it has reached the proper position for giving access to the rear seat.

J represents the deck panel which extends from the tail board forwardly and has its front edge arranged in rear of the front seat at a sufficient distance to afford the necessary room for the occupants of the rear seat.

K represents the rear seat which is attached at its front end to the front end of the deck panel by hinges k in such manner that the rear seat can be swung forwardly from its operative position, represented in Fig. 1, to a position in which it forms a forward continuation of the deck panel, as represented in Fig. 2. The rear seat rests in this position upon the upper ends of the standards l secured to the inner sides of the body panels c. The deck panel is arranged somewhat lower than the front seat, so that, when the rear seat is swung down, the rear portion of the front seat projects rearwardly over the front portion of the folded-down rear seat and holds the latter down, as represented in Fig. 2. Rubber stops m are preferably interposed between the rear portion of the front seat and the folded-down rear seat to prevent rattling.

N represents the back of the rear seat which is attached to the same by hinges n so that this back can be folded down upon the rear seat before the latter is folded down in line with the deck panel. The back is preferably secured in this position by a strap o, or other suitable means.

When both seats are in their operative positions, as shown in Fig. 1, and it is desired to use only the front seat, the latter is tilted forwardly, the rear seat is folded down and the front seat is swung back to its normal position, thereby forming a vehicle with a single exposed seat and a tight deck extending rearwardly therefrom, which presents a sightly appearance and prevents the entrance of dirt into the body of the vehicle.

I claim as my invention—

1. The combination with the vehicle body having its side panels arranged in rear of the front seat and a deck panel covering the rear portion of the body, of a rear seat hinged at its front to the front of the deck panel to fold forwardly, and a front seat having side panels rigidly secured thereto and hinged at their fronts to the body to tilt forwardly, substantially as set forth.

2. The combination with the vehicle body having its side panels arranged in rear of the front seat and a deck panel covering the rear portion of the body, of a rear seat hinged at its front to the front of the deck panel to swing forwardly, and a front seat having side panels rigidly secured thereto and hinged at their fronts to the body, said front seat being arranged higher than said deck panel and overlapping with its rear portion the front portion of the rear seat when the latter is folded down, substantially as set forth.

3. The combination with the vehicle body, of a front seat hinged at its front to the body to tilt forwardly, a bracket or loop secured to the bottom of the body, and a depending hook attached to the tilting seat and engaging against said bracket and limiting the forward movement of the seat, substantially as set forth.

Witness my hand this 26th day of April, 1893.

CHRISTOPHER C. BRADLEY.

Witnesses:
C. S. BUNNELL,
E. P. HASBROUCK.